(12) United States Patent
Plank et al.

(10) Patent No.: US 11,046,248 B2
(45) Date of Patent: Jun. 29, 2021

(54) LIGHT MODULE FOR A MOTOR VEHICLE HEADLAMP

(71) Applicant: ZKW Group GmbH, Wieselburg (AT)

(72) Inventors: Josef Plank, Purgstall/Erlauf (AT);
Martin Lahmer, Münichreith (AT);
Josef Pürstinger, Bad Hall (AT);
Markus Danner, Ollersdorf (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 16/971,152

(22) PCT Filed: Jan. 21, 2019

(86) PCT No.: PCT/EP2019/051349
§ 371 (c)(1),
(2) Date: Aug. 19, 2020

(87) PCT Pub. No.: WO2019/162007
PCT Pub. Date: Aug. 29, 2019

(65) Prior Publication Data
US 2021/0086691 A1 Mar. 25, 2021

(30) Foreign Application Priority Data
Feb. 23, 2018 (EP) .................................... 18158355

(51) Int. Cl.
*B60Q 11/00* (2006.01)
*B60Q 1/00* (2006.01)
*B60Q 1/04* (2006.01)
*F21S 41/255* (2018.01)
(Continued)

(52) U.S. Cl.
CPC .......... *B60Q 11/005* (2013.01); *B60Q 1/0023* (2013.01); *B60Q 1/04* (2013.01);
(Continued)

(58) Field of Classification Search
CPC ....... B60Q 1/04; B60Q 1/0023; F21S 41/675; F21S 41/67; F21S 41/36
See application file for complete search history.

(56) References Cited

U.S. PATENT DOCUMENTS 10,344,932 B2 * 7/2019 Reisinger ............... F21S 41/285
10,801,689 B2 * 10/2020 Mitterlehner ............ B60Q 1/14
(Continued)

FOREIGN PATENT DOCUMENTS

| DE | 102014017521 A1 | 6/2016 |
| DE | 102016209645 A1 | 12/2017 |

OTHER PUBLICATIONS

International Search Report for PCT/EP2019/051349, dated Apr. 24, 2019 (1 page).
(Continued)

*Primary Examiner* — William N Harris
(74) *Attorney, Agent, or Firm* — Eversheds Sutherland (US) LLP

(57) ABSTRACT

The invention relates to a light module for a motor vehicle headlamp, comprising at least one optoelectronic component (300), which is arranged in the main emission direction of a first illuminant (110) and which comprises a controllable arrangement of a plurality of micromirrors (310), which can be pivoted into a first and a second position. Micromirrors (310) that are in the first position deflect light beams toward at least one projection optical unit (400), which is designed to produce a light distribution. Micromirrors (310) that are in the second position deflect light beams toward a light-beam-absorbing absorber (500). The light module also comprises at least a control device (200), a sensor element (600) and a second illuminant (120). The control device (200) is designed to control the sensor element (600) and the second illuminant (120). Micromirrors (310) that are in the first position deflect the light beams that can be emitted by the
(Continued)

Figure 1:
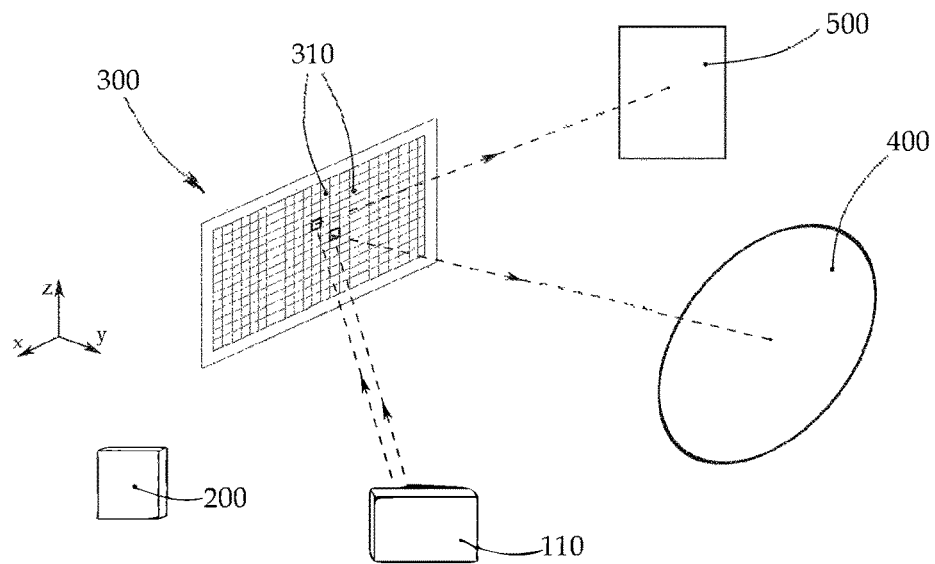

second illuminant (120) toward the sensor element (600). The sensor element (600) is designed to sense light beams from the second illuminant (120) in order to obtain a value, and to transmit said value to the control device (200), which compares the value with a threshold value stored in a memory. Switching on of the first illuminant (110) is prevented when the threshold value is reached, or the first illuminant (110) is switched on when the threshold value is fallen below.

13 Claims, 3 Drawing Sheets

(51) Int. Cl.
    *F21S 41/176*     (2018.01)
    *F21S 41/36*     (2018.01)
    *F21S 41/675*     (2018.01)
    *F21S 41/16*     (2018.01)
    *F21S 41/40*     (2018.01)

(52) U.S. Cl.
    CPC ............ *F21S 41/16* (2018.01); *F21S 41/176* (2018.01); *F21S 41/255* (2018.01); *F21S 41/36* (2018.01); *F21S 41/40* (2018.01); *F21S 41/675* (2018.01)

(56) References Cited

U.S. PATENT DOCUMENTS

| | | | |
|---|---|---|---|
| 2010/0067095 A1 | 3/2010 | Fulton et al. | |
| 2014/0029282 A1* | 1/2014 | Ravier | F21S 41/173 362/510 |
| 2015/0191115 A1* | 7/2015 | Yamamura | F21S 41/675 315/82 |
| 2015/0211703 A1* | 7/2015 | Nakazawa | B60Q 1/085 362/514 |
| 2015/0219302 A1* | 8/2015 | Yagi | F21S 41/365 362/512 |
| 2015/0369437 A1* | 12/2015 | Reinprecht | F21S 41/143 362/510 |
| 2017/0038582 A1* | 2/2017 | Chau | F21S 41/176 |
| 2017/0350570 A1 | 12/2017 | Schwaiger et al. | |
| 2018/0147978 A1* | 5/2018 | Reisinger | B60Q 1/085 |
| 2018/0328563 A1* | 11/2018 | Park | B60Q 1/085 |

OTHER PUBLICATIONS

Search Report for European Patent Application No. 18158355, dated Aug. 8, 2018 (1 page).

* cited by examiner

LIGHT MODULE FOR A MOTOR VEHICLE HEADLAMP

The invention relates to a light module for a motor vehicle headlamp, comprising at least one optoelectronic component, arranged in the main emission direction of a first illuminant, which optoelectronic component comprises a controllable arrangement of a plurality of micromirrors, which are arranged in the form of a two-dimensional matrix, with rows and columns, and can be pivoted independently of one another into a first and a second position, wherein micromirrors that are located in the first position, deflect light beams, which are emitted from the first illuminant, onto at least one projection optical unit, which at least one projection optical unit is designed to produce a light distribution, or part of a light distribution, of a light function, and micromirrors, which are located in the second position, deflect light beams, which are emitted by the first illuminant, onto a light beams-absorbing absorber, and wherein the light module furthermore has at least one control device, which is designed to control the first illuminant and the micromirrors of the optoelectronic component.

The invention furthermore relates to a motor vehicle headlamp, comprising at least one light module according to the invention.

Finally, the invention relates to a method for the fault checking of a light module according to the invention.

In the development of current headlamp systems, the focus is increasingly on the desire to be able to project a light image onto the road surface with as high a resolution as possible, which light image can be altered quickly and adapted to the respective traffic, road and lighting conditions.

The term "road surface" is used here for the sake of simplicity, because it naturally depends on local conditions as to whether a light image is actually located on the road surface or extends beyond it, for example onto the edge of the road surface.

In principle, the light image is described in terms of a projection onto a vertical surface in accordance with the relevant standards relating to motor vehicle lighting technology, wherein a variably controllable reflector surface is formed from a multiplicity of micromirrors, and reflects light beams emitted by a first illuminant into an emission direction of the headlamp.

Here any number of lighting functions with different light distributions can be implemented, such as a dipped beam light distribution, a cornering light distribution, a city light distribution, a motorway light distribution, a bend lighting light distribution, a main beam light distribution, or the formation of a dazzle-free main beam. Furthermore, symbol projections can also ensue, such as, for example, danger symbols, navigation arrows, manufacturer logos, or similar.

For the micromirror arrangement, the so-called "digital light processing" projection technology—in brief DLP—is preferably used, in which images are produced by the modulation of a digital image onto a light beam. Here, a rectangular arrangement of movable micromirrors, also known as pixels, splits the light beam into sub-regions, and then reflects, or deflects, it pixel-by-pixel, either into, or out of, the projection path.

The basis for this technology is preferably an optoelectronic component, which contains the rectangular arrangement in the form of a matrix of micromirrors and their control technology, for example a "digital micromirror device"—in brief a DMD.

A DMD microsystem takes the form of a "spatial light modulator" (SLM), which consists of micromirror actuators arranged in the form of a matrix, that is to say, tiltable or pivotable reflecting surfaces, with, for example, an edge length of approx. 7 μm. The mirror surfaces are designed such that they can be moved by the actions of electrostatic fields.

Each micromirror is individually adjustable in its angle, and usually has two stable end states, between which it can be alternated, for example, at up to 5,000 times per second.

The number of micromirrors corresponds to the resolution of the projected image, wherein one micromirror can represent one or a plurality of pixels. Nowadays DMD chips with high resolutions in the megapixel range can be obtained.

With currently used motor vehicle headlamps, the light distribution produced, for example for a dazzle-free main beam, can be controlled dynamically in such a way that oncoming vehicles are detected and the light distribution produced, for example by a matrix of LED light sources, is darkened in the direction of the oncoming vehicle.

In future, DMDs will be used for high-resolution motor vehicle headlamp systems. By virtue of the internal build of the DMD component, feedback on the actual position of the pixels, for example the first and second positions, is not possible.

For use in motor vehicle headlamps, high requirements are specified with regard to the dazzling of oncoming traffic, or preceding vehicles. For this reason, a risk assessment must assess the risk of pixels getting stuck in a faulty position, and the possible need for monitoring for faulty pixels or micromirrors. However, the DMD components available today do not offer any direct opportunity to detect the positions of the micromirrors in order to recognise a potential positional failure.

Since the possible dazzling of other road users is a potential safety risk, micromirrors, or pixels, that get stuck in the first position are considered to be particularly critical. Depending on the build of the system, even a single pixel could lead to the dazzle values being exceeded.

It is an object of the invention to provide an improved light module, which enables the positions of the respective micromirrors of an optoelectronic component to be checked.

This object is achieved in that the light module further comprises a sensor means and a second illuminant, wherein the control device is designed to control the sensor means and the second illuminant, and wherein micromirrors, which are located in the first position, deflect the light beams that can be emitted from the second illuminant onto the sensor means, and micromirrors, which are located in the second position, deflect the light beams that can be emitted from the second illuminant onto the absorber, wherein the sensor means are designed to detect the light beams of the second illuminant deflected by the optoelectronic component onto the sensor means so as to obtain a value, and to transmit this value to the control device, which control device compares the value with a predefined threshold value stored in a memory, wherein the control device prevents the first illuminant from being switched on when the predefined threshold value is reached, or switches on the first illuminant when the value falls below the predefined threshold value.

By this means it is possible to detect even a single micromirror that is located in a faulty position, as it is not the micromirrors that are located in a correct position that are checked. For example, it would in principle be possible to detect the light beams of the first illuminant on the absorber, for example by means of a camera chip, but this can lead to superposition and very severe overexposure between the pixels of the camera chip, so that a single micromirror in a faulty position cannot be recognised.

Also no reliable detection is possible on the basis of the luminous flux, since, for example, at a resolution of 400,000 pixels, one defective pixel would only cause a reduction of the luminous flux by 0.00025%, and could therefore not be measured.

Provision can be made for the sensor means to be able to detect the entire surface of the optoelectronic component. The size of the sensor means ensues from the corresponding angles of the light cone.

Provision can be made that, when the light module is installed in a motor vehicle headlamp, the sensor means is arranged above the projection optical unit.

Furthermore, provision can be made for the sensor means to be shielded from stray light.

Provision can advantageously be made for at least one optical attachment to be arranged in each case in the main emission direction of the first and second illuminants, which optical attachment is designed to collimate the light beams of the respective illuminant.

For example, when using LED light sources, a TIR lens can be used as an optical attachment.

The term "main direction of emission" is understood to mean the direction in which the first illumination means emits with most intensity, that is to say, with most light, by virtue of its directivity.

Provision can be made for the first and/or the second illuminant to have at least one light source, wherein the at least one light source is designed as an LED, or as a laser light source, preferably a laser diode, with a light conversion element.

Provision is preferably made that, in the case in which two or more light-emitting diodes are provided, each light-emitting diode can be controlled independently of the other light-emitting diodes.

Each light-emitting diode can thus be switched on and off independently of the other light-emitting diodes of a light source, and preferably, in the case of dimmable light-emitting diodes, can also be dimmed independently of the other light-emitting diodes of the light source.

Since laser devices generally emit coherent, monochromatic light, or light in a narrow wavelength range, but white mixed light is generally preferred, or required by law, for the light emitted from a motor vehicle headlamp, so-called light conversion elements are arranged in the emission direction of the laser device for purposes of converting essentially monochromatic light into white or polychromatic light, wherein "white light" is understood to mean light of a spectral composition such as causes the colour impression of "white" for human beings. This light conversion element is designed, for example, in the form of one or a plurality of photoluminescence converters or photoluminescence elements, wherein incident laser beams from the laser device impinge on the light conversion element, which usually contains a photoluminescent dye, and excite the said photoluminescent dye to photoluminesce, and thereby emit light in a wavelength, or wavelength range, that differs from the light from the irradiating laser device. Here the light output of the light conversion element essentially has the characteristics of a Lambertian radiator.

With light conversion elements, a distinction is made between reflective and transmissive conversion elements.

The terms "reflective" and "transmissive" refer to the blue component of the converted white light. In a transmissive build, the main propagation direction of the blue light component after passing through the converter volume, or conversion element, is essentially in the same direction as the propagation direction of the output laser beam. In a reflective build, the laser beam is reflected, or deflected, at a boundary surface attributable to the conversion element, such that the blue light component has a propagation direction that differs from that of the laser beam, which is usually designed as a blue laser beam.

Advantageously, the optoelectronic component can be designed as a DMD.

In one practical form of embodiment provision can be made for the sensor means to be designed as a light-sensitive CCD sensor.

Provision can be made for the sensor means to be arranged above or below the at least one projection optical unit in the light module.

The terms "above" and "below" relate in each case to a light module when installed in a motor vehicle.

Here the first illuminant, the at least one projection optical unit, and a micromirror, define a fictitious first plane, and the second illuminant, the sensor means, and the same micromirror, define a second fictitious plane, wherein the first plane can be tilted relative to the second plane, wherein the line of intersection runs through the micromirror, that is to say, the optoelectronic component. Such tilting can cause the sensor means to be located above or below the at least one projection optical unit.

Provision can also be made for the first and second planes to be tilted and/or rotated relative to each other.

The light module in question can also be provided for the production of a dipped beam distribution, and/or a main beam distribution, in particular for dynamic light adaptation of a dipped beam distribution, and/or a main beam distribution, for example in order not to dazzle an oncoming and/or a preceding vehicle.

As already mentioned in the introduction, the invention further relates to a method for the fault checking of a light module for a motor vehicle headlamp, comprising the following steps a) Provision of a sensor means and a second illuminant, wherein the at least one control device is designed to control the sensor means and the second illuminant, b) Control of the micromirrors by means of the at least one control device so as to move the micromirrors into the second position, c) Switch-on of the second illuminant, wherein micromirrors that are located in the first position, deflect the light beams emitted by the second illuminant onto the sensor means, and micro-mirrors that are located in the second position, deflect the light beams emitted by the second illuminant onto the absorber, d) Detection of the light beams of the second illuminant, which light beams are deflected by micromirrors located in the first position, by means of the sensor means, so as to obtain a value, for example a brightness value, e) Transmission of the value detected by the sensor means to the control device, wherein the control device compares the transmitted value with a predefined threshold value that is stored in a memory.

f) Switch-on of the first illuminant by means of the control device when the value falls below the predefined threshold value, or g) Prevention of the switch-on of the first illuminant by the control device when the predefined threshold value is reached.

Figure 2:
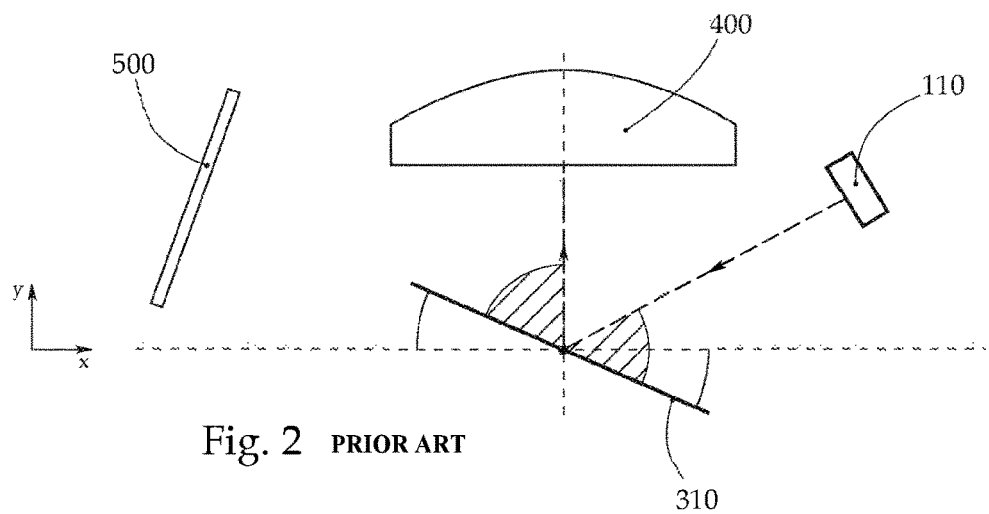
Figure 3:
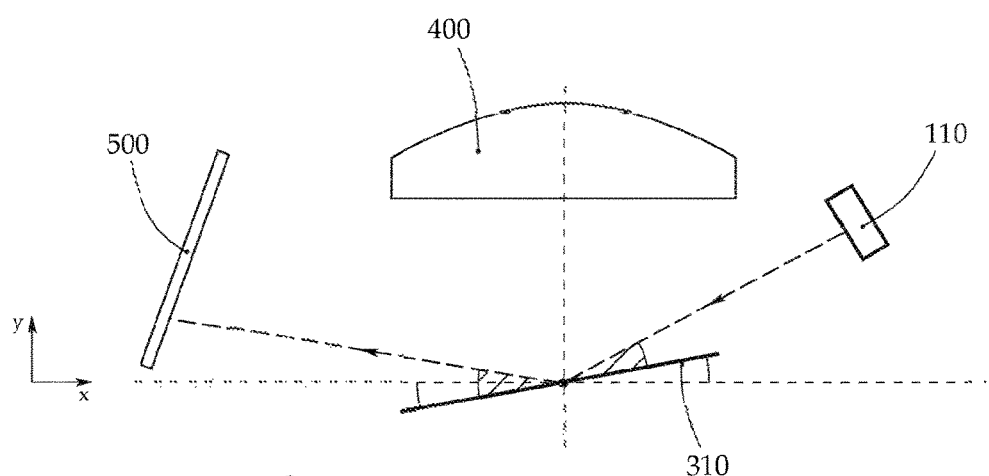
Figure 4:
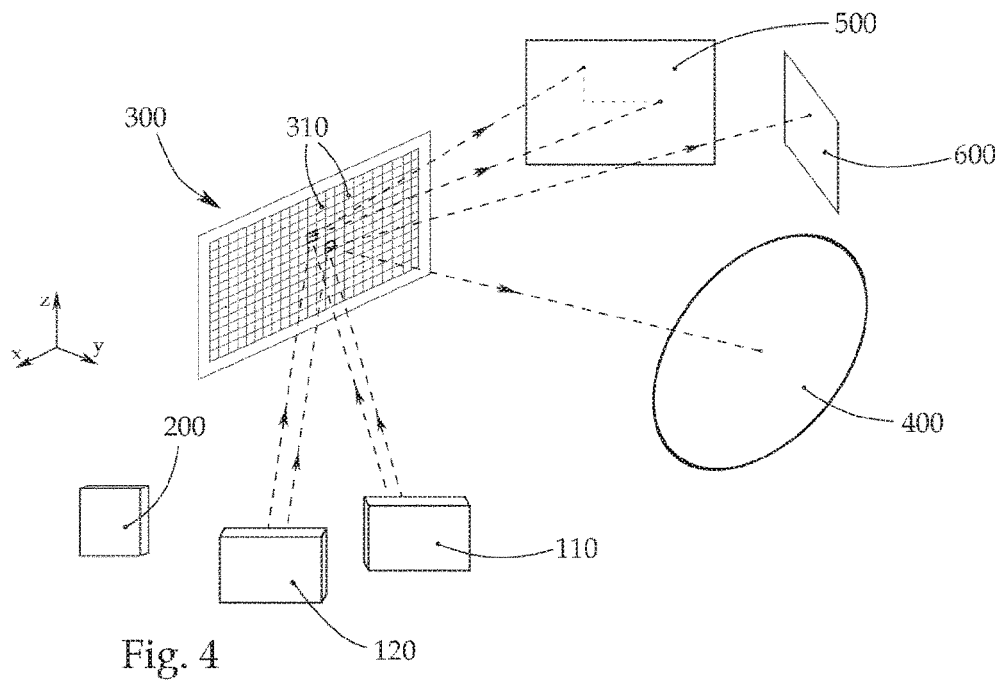
Figure 5:
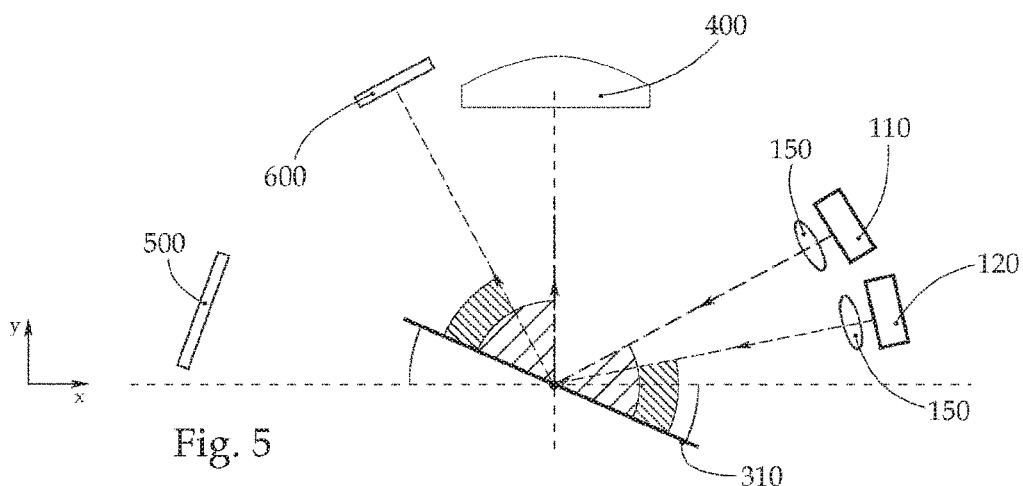
Figure 6:
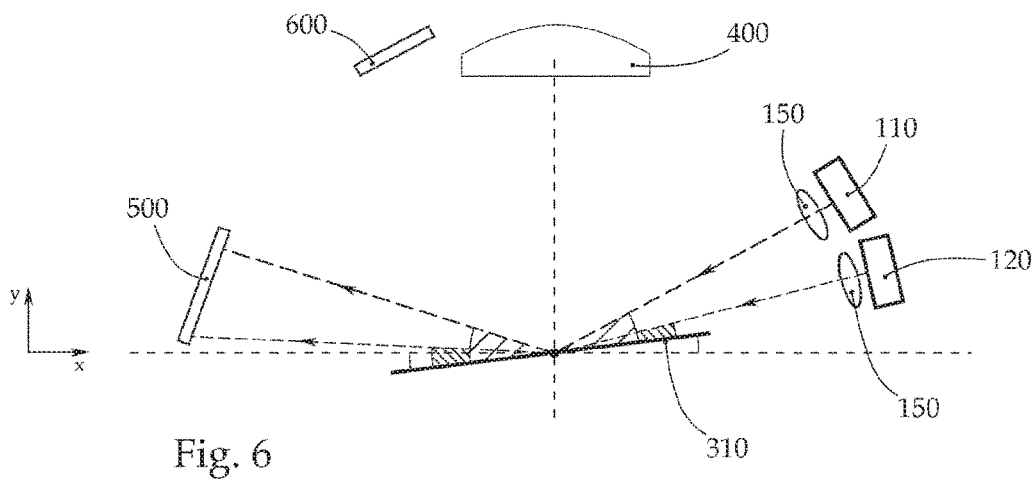
Figure 7:
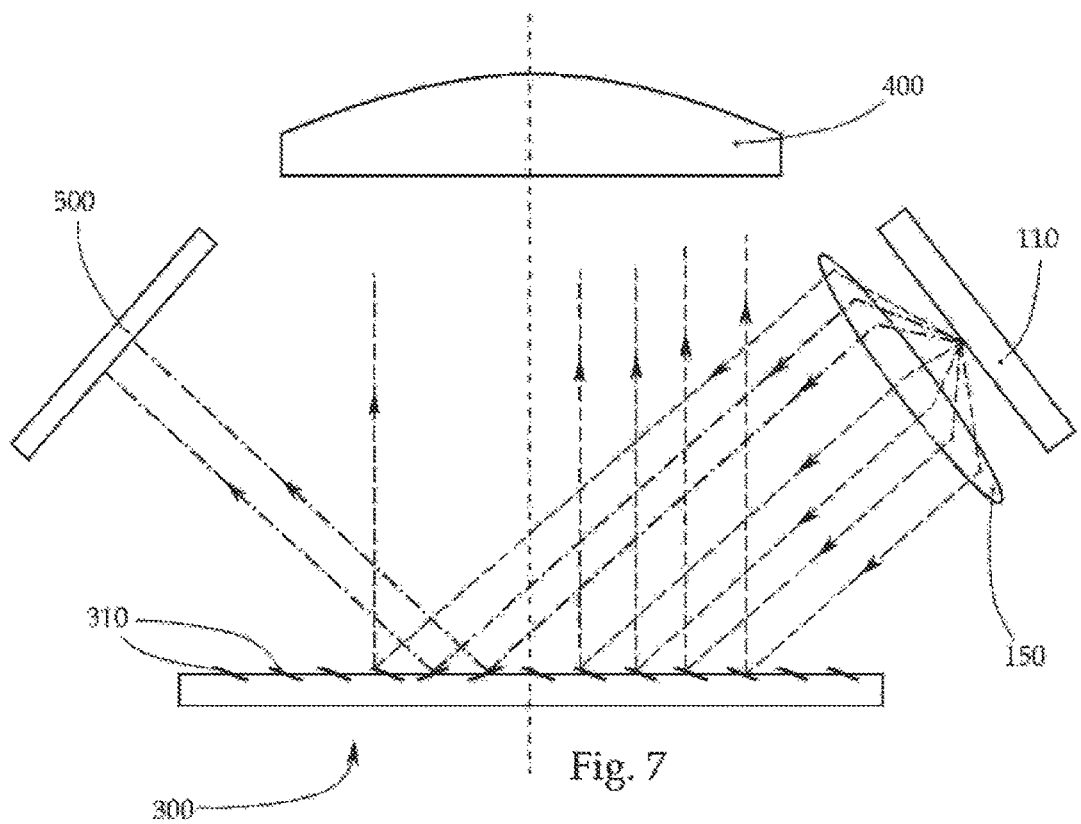
Figure 8:
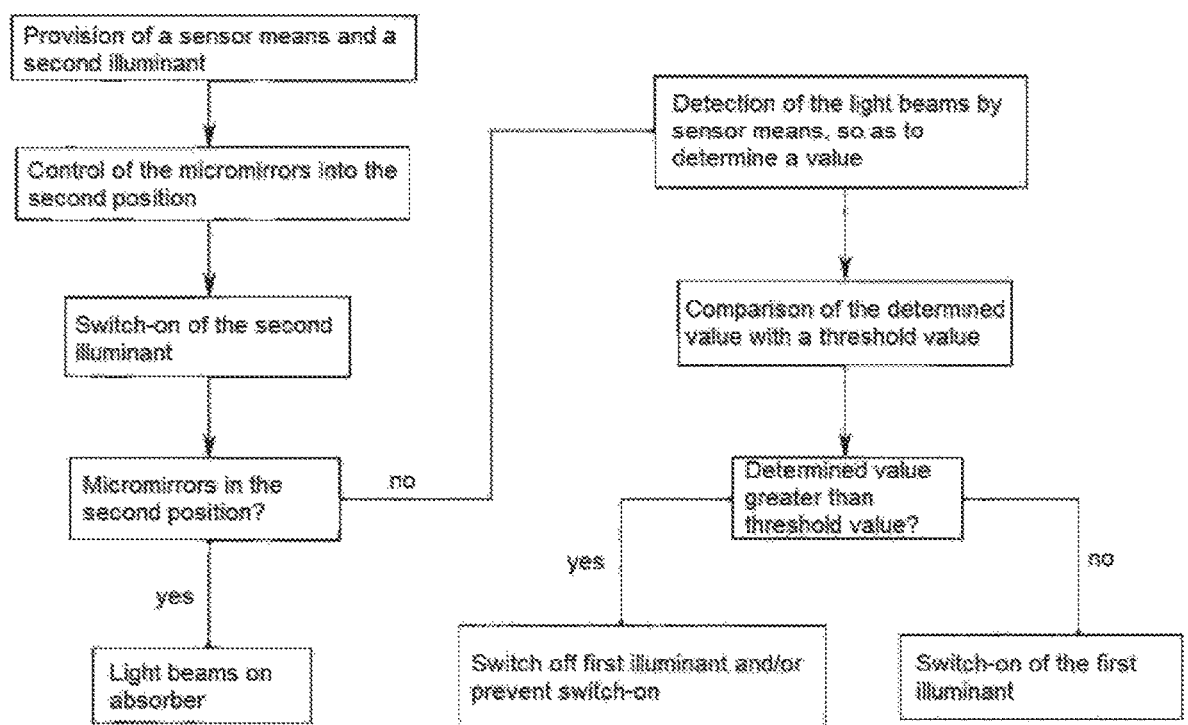

In what follows the invention is explained in more detail with the aid of exemplary figures. Here:

FIG. 1 shows a light module of the prior art, with an optoelectronic component having a micromirror, a first illuminant, a control device, an absorber and a projection optical unit, FIG. 2 shows a detail of a plan view onto a micromirror of the light module from FIG. 1, which micromirror is located in a first position, FIG. 3 shows a detail of a plan view onto a micromirror of the light module from FIG. 1, which micromirror is located in a second position, FIG. 4 shows an exemplary light module, which, in addition to the light module from FIG. 1, comprises a second illuminant and a sensor means, FIG. 5 shows a detail of a plan view onto a micromirror of the light module from FIG. 4, which micromirror is located in a first position, FIG. 6 shows a detail of a plan view onto a micromirror of the light module from FIG. 4, which micromirror is located in a second position, FIG. 7 shows a sketch of light beams collimated and variously guided by an optical attachment, which light beams are deflected by variously positioned micromirrors of an optoelectronic component, and FIG. 8 shows a block diagram of an exemplary method for the fault checking of a light module.

FIG. 1 shows a light module, for example for a motor vehicle headlamp, of the prior art, which light module comprises at least one optoelectronic component 300 arranged in the main emission direction of a first illuminant 110, which optoelectronic component 300 comprises a controllable arrangement of a plurality of micromirrors 310, which micromirrors 310 are arranged in the form of a two-dimensional matrix, with rows and columns, and can be pivoted independently of one another into a first and a second position.

In the examples shown, the optoelectronic component 300 is designed as a DMD (a digital mirror device).

The term "main emission direction" is understood to mean the direction in which the first illumination means emits with most intensity, that is to say, with most light, by virtue of its directivity.

Furthermore, micromirrors 310 that are located in the first position, deflect light beams, which are emitted by the first illuminant 110, onto at least one projection optical unit 400, wherein the at least one projection optical unit 400 is designed to produce a light distribution, or part of a light distribution, of a light function, for example a dipped beam function, and/or a main beam function.

In the "dipped beam" light function, the light module produces a light distribution which, when the light module is installed in a vehicle, produces a dipped beam distribution in front of the vehicle in the direction of travel, which complies with legal requirements.

In the "main beam" light function, the light module produces a light distribution which, when the light module is installed in a vehicle, produces a main beam distribution in front of the vehicle in the direction of travel, which complies with legal requirements.

In this context the term "direction of travel" means the direction in which a driven motor vehicle moves as intended by its design. In this context, technically possible driving in reverse is not defined as a direction of travel.

The light functions and light distributions listed above are not exhaustive; wherein the illumination device may also produce combinations of these light functions, and/or produces only a partial light distribution, that is to say, for example, only a part of a main beam, dipped beam, fog light, or daytime running light distribution.

Furthermore, micromirrors 310 that are located in the second position, deflect light beams, which are emitted by the first illuminant 110, onto a light beams-absorbing absorber 500.

In addition, the light module has at least one control device 200, which is designed to control the first illuminant 110 and the micromirrors 310 of the optoelectronic component 300, for example so as to switch the first illuminant on or off.

FIG. 2 shows a view from above, that is to say, in the direction of the z-axis, as is also indicated in FIG. 2, of the arrangement of the light module from FIG. 1, wherein an exemplary micromirror 310 of the optoelectronic component 300 is shown in a detail.

It should be noted that the coordinate systems indicated in the figures, and also the arrangement and alignment of the light modules shown in these coordinate systems, are to be understood only as examples.

The micromirror 310 as shown is located in the first position, wherein furthermore an exemplary light beam of the first illuminant 110 is shown, which is deflected by the micromirror 310 located in the first position to the projection optical unit 400.

The hatched angular regions in FIG. 2 represent the angle of incidence and the angle of reflection of the light beam deflected by the micromirror 310, wherein the angle of incidence and the angle of reflection are identical.

FIG. 3 shows a view from above, that is to say, in the direction of the z-axis, which is also indicated in FIG. 3, of the arrangement of the light module from FIG. 1, wherein an exemplary micromirror 310 of the optoelectronic component 300 is shown in a detail.

The micromirror 310 as shown is located in the second position, wherein furthermore an exemplary light beam of the first illuminant 110 is shown, which is deflected by the micromirror 310 located in the first position onto the absorber 500.

The hatched angular regions in FIG. 3 represent the angle of incidence and the angle of reflection of the light beam deflected by the micromirror 310, wherein the angle of incidence and the angle of reflection are identical.

FIG. 4 shows a light module according to the invention, wherein the said light module comprises, in addition to the build already shown in FIG. 1, a sensor means 600 and a second illuminant 120, wherein the control device 200 is arranged to control the sensor means 600 and the second illuminant 120, for example so as to switch the second illuminant on or off.

In the example shown in FIG. 4, the sensor means 600 is designed as a light-sensitive CCD sensor, wherein other designs are also conceivable.

Furthermore, micromirrors 310 that are located in the first position, deflect the light beams that can be emitted by the second illuminant 120 onto the sensor means 600, and micromirrors 310 that are located in the second position, deflect the light beams that can be emitted by the second illuminant 120 onto the absorber 500.

Light beams of the first illuminant 110 are deflected by the corresponding micromirrors, as in the light module in FIG. 1.

Furthermore, the sensor means 600 is designed to detect the light beams of the second illuminant 120, deflected by the optoelectronic component 300 onto the sensor means 600, in the form of a value, for example a brightness value, and to transmit this value to the control device 200, which control device 200 compares the value with a predefined threshold value stored in a memory, wherein the control device 200 prevents the first illuminant 110 from being switched on when the predefined threshold value is reached, or switches on the first illuminant 110 when the value falls below the predefined threshold value.

It should be noted that the position of the sensor means 600 in the figures is to be understood as exemplary, and can, for example, also—as viewed in the z-direction of the coordinate system indicated in FIG. 4—be arranged above the projection optical unit 400. This can counteract possible space problems in a motor vehicle headlamp, for example.

Provision can also be made, for example, for the sensor means 600 to be located above or below the at least one projection optical unit 400 in the light module.

The terms "above" and "below" relate in each case to a light module when installed in a motor vehicle.

Here, the first illuminant 110, the at least one projection optical unit 400, and a micromirror 310, define a fictitious first plane, and the second illuminant 120, the sensor means 600, and the same micromirror 310, define a second fictitious plane, wherein the first plane can be tilted relative to the second plane, wherein the line of intersection runs through the micromirror 310, that is to say, the optoelectronic component 300. Such tilting can cause the sensor means 600 to be located above or below the at least one projection optical unit 400.

Provision can also be made for the first and second planes to be tilted and/or rotated relative to each other.

The first and/or the second illuminant 110, 120 can have at least one light source, wherein the at least one light source is designed as a light emitting diode—also called an LED—or as a laser light source, preferably a laser diode, with a light conversion element.

In the case in which two or more light-emitting diodes are provided, provision is preferably made for each light-emitting diode to be controllable independently of the other light-emitting diodes.

Each light-emitting diode can thus be switched on and off independently of the other light-emitting diodes of a light source, and in the case of dimmable light-emitting diodes, can preferably also be dimmed independently of the other light-emitting diodes of the light source.

FIGS. 5 and 6 show a view from above, that is to say, in the direction of the z-axis, which is indicated in FIGS. 5 and 6 by a coordinate system, of the arrangement of the light module from FIG. 4, wherein an exemplary micromirror 310 of the optoelectronic component 300 is shown in a detail.

The micromirror 310 as shown in FIG. 5 is located in the first position, wherein exemplary light beams of the first and second illuminants 110, 120 are also shown, wherein the light beam emitted by the first illuminant 110 is deflected onto the projection optical unit 400, and the light beam emitted by the second illuminant 120 is deflected onto the sensor means 600.

The micromirror 310 as shown in FIG. 6 is located in the second position, wherein exemplary light beams of the first and second illuminants 110, 120 are also shown, which light beams are in each case deflected by the micromirror 310 located in the second position onto the absorber 500.

FIG. 5 and FIG. 6 show at least one optical attachment 150 arranged in the main emission direction of the first and second illuminants 110, 120, which optical attachment 150 is designed to collimate the light beams of the respective illuminants 110, 120.

FIG. 7 shows a detailed view of this feature, wherein only the first illuminant 110 with an optical attachment 150 is shown, although the processes shown are to be understood as only exemplary. The micromirrors 310 of the optoelectronic component 300 are here located in the first or the second position, wherein the light beams of the first illuminant 110, collimated by the optical attachment 150, are deflected by the micromirrors 310 that are located in the first position onto the projection optical unit 400, and are deflected by the micromirrors 310 that are located in the second position onto the absorber 500.

FIG. 8 shows a method for the fault checking of a light module according to the invention, wherein in a first step a sensor means 600 and a second illuminant 120 are provided, wherein the at least one control device 200 is designed to control the sensor means 600 and the second illuminant 120.

In a so-called test mode, the micromirrors 310 are first controlled by means of the at least one control device 200 so as to move the micromirrors 310 into the second position.

In the said test mode a check is then made as to whether all the micromirrors 310 are located in the second position, wherein micromirrors 310 that are stuck can occur, which have remained in the first position.

The second illuminant 120 is then switched on, wherein micromirrors 310 that are stuck and are located in the first position, deflect the light beams emitted by the second illuminant 120 onto the sensor means 600, and micromirrors 310, which are located in the second position as intended, deflect the light beams emitted by the second illuminant 120 onto the absorber 500.

Furthermore, the light beams of the second illuminant 120, which are deflected by micromirrors 310 located in the first position, are detected by the sensor means 600 in the form of a value, for example a brightness value.

Provision can also be made for the number of incident photons also to be detected and counted, wherein other values that are to be detected are also possible.

The said value is transmitted to the control device 200, which control device 200 compares the value with a predefined threshold value stored in a memory, wherein the control device 200 prevents the first illuminant 110 from being switched on when the predefined threshold value is reached, or switches on the first illuminant 110 when the value falls below the predefined threshold value.

Such a threshold value corresponds, for example, to a legally prescribed dazzle value that must not be exceeded, in order to avoid dazzling a driver of an oncoming or preceding vehicle in the event of any micro-mirrors 310 that are stuck and remain in the first position, and can no longer be correctly controlled by the control device 200.

If the value detected by the sensor means 600 falls below the threshold value, a signal is transmitted to the control device 200 by the sensor means 600, wherein the first illuminant 110 is switched on by means of the control device 200.

LIST OF REFERENCE SYMBOLS

First illuminant 110
Second illuminant 120
Optical attachment 150
Control device 200
Optoelectronic component 300
Micromirror 310

Projection optical unit 400
Absorber 500
Sensor means 600

The invention claimed is:

1. A light module for a motor vehicle headlamp, which light module comprises:
   at least one optoelectronic component (300), which is arranged in the main emission direction of a first illuminant (110), and which has a controllable arrangement of a plurality of micromirrors (310), which micromirrors (310) are arranged in the form of a two-dimensional matrix, with rows and columns, and can be pivoted independently of one another into a first and a second position, wherein micromirrors (310) that are located in the first position, deflect light beams, which are emitted by the first illuminant (110), onto at least one projection optical unit (400), which at least one projection optical unit (400) is designed to produce a light distribution, or part of a light distribution;
   at least one control device (200), which is designed to control the first illuminant (110) and the micromirrors (310) of the optoelectronic component (300); and
   a sensor means (600) and a second illuminant (120), wherein the control device (200) is designed to control the sensor means (600) and the second illuminant (120),
   wherein:
   the micromirrors (310) that are located in the first position deflect the light beams, which can be emitted by the second illuminant (120), onto the sensor means (600),
   the sensor means (600) is designed to detect the light beams of the second illuminant (120) deflected by the micromirrors (310) onto the sensor means (600), so as to obtain a value, and to transmit this value to the control device (200), which control device (200) compares the value with a predefined threshold value stored in a memory, and
   the control device (200) (i) prevents the first illuminant (110) from being switched on when the predefined threshold value is reached, or (ii) switches on the first illuminant (110) when the value falls below the predefined threshold value.

2. The light module according to claim 1, wherein the micromirrors (310) that are located in the second position, deflect light beams, which are emitted by the first illuminant (110), onto a light beams-absorbing absorber (500).

3. The light module according to claim 1, wherein the micromirrors (310) that are located in the second position deflect the light beams, which can be emitted by the second illuminant (120), onto a light beams-absorbing absorber (500).

4. The light module according to claim 1, wherein at least one optical attachment (150) is arranged in each case in front of the first and second illuminants (110, 120) in the main emission direction of the first and the second illuminants (110, 120), which optical attachment is designed to collimate the light beams of the respective illuminant (110, 120).

5. The light module according to claim 1, wherein the first and/or the second illuminant has at least one light source, wherein the at least one light source comprises an LED or a laser diode with a light conversion element.

6. The light module according to claim 1, wherein the optoelectronic component (300) is designed as a DMD.

7. The light module according to claim 1, wherein the sensor means (600) is designed as a light-sensitive CCD sensor.

8. The light module according to claim 1, wherein the sensor means (600) is arranged above or below the at least one projection optical unit (400) in the light module.

9. A motor vehicle headlamp with at least one light module according to claim 1.

10. A method for the fault checking of the light module of claim 1, the method comprising:
    deflecting the light beams emitted by the second illuminant (120) onto the sensor means (600);
    detecting the light beams of the second illuminant (120), which light beams are deflected by micromirrors (310) located in the first position, by means of the sensor means (600), so as to obtain a value;
    transmitting the value detected by the sensor means (600) to the control device (200), wherein the control device (200) compares the transmitted value with a predefined threshold value stored in a memory; and
    either (i) switching on the first illuminant (110) by means of the control device (200) when the value falls below the predefined threshold value, or (ii) preventing the first illuminant (110) from being switched on by the control device (200) when the predefined threshold value is reached.

11. The method according to claim 10, wherein the micromirrors (310) that are located in the second position, deflect light beams, which are emitted by the first illuminant (110), onto a light beams-absorbing absorber (500).

12. The method according to claim 11, wherein the micromirrors (310) that are located in the second position, deflect the light beams emitted by the second illuminant (120) onto the absorber (500).

13. The method according to claim 10, wherein the value is a brightness value.

* * * * *